(12) United States Patent
Kikuchi

(10) Patent No.: US 12,730,077 B2
(45) Date of Patent: Sep. 8, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Tomoe Kikuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 18/757,281

(22) Filed: Jun. 27, 2024

(65) Prior Publication Data

US 2025/0003889 A1 Jan. 2, 2025

(30) Foreign Application Priority Data

Jun. 29, 2023 (JP) ................................ 2023-107221

(51) Int. Cl.
*G01N 21/88* (2006.01)

(52) U.S. Cl.
CPC . *G01N 21/8851* (2013.01); *G01N 2021/8887* (2013.01)

(58) Field of Classification Search
CPC ....... G01N 21/8851; G01N 2021/8864; G01N 2021/8887
See application file for complete search history.

(56) References Cited

U.S. PATENT DOCUMENTS

2021/0134065 A1* 5/2021 Ramani ................. G06F 3/0346

FOREIGN PATENT DOCUMENTS

JP 2019191105 A 10/2019

OTHER PUBLICATIONS

Xuan Zhang, “Stud Pose Detection Based on Photometric Stereo and Lightweight YOLOv4”, Dec. 27, 2021 (Year: 2021).*
Nicholas J. Durr, “System for Clinical Photometric Stereo Endoscopy”, 2014 (Year: 2014).*
Frank Verbiest, “Photometric Stereo with Coherent Outlier Handling and Confidence Estimation”, 2008 (Year: 2008).*

* cited by examiner

*Primary Examiner* — Maurice C Smith
(74) *Attorney, Agent, or Firm* — Canon U.S.A., Inc. IP Division

(57) ABSTRACT

An image processing apparatus comprises one or more memories storing instructions and one or more processors coupled to the one or more memories. Execution of the instructions causes the one or more processors to obtain a normal map indicating a spatial distribution of normals on a surface of an object, obtain a direction vector of a virtual light source according to a variation in orientation of the object, and perform processing for detecting a linear feature on the surface based on the normal map and the direction vector.

14 Claims, 8 Drawing Sheets

101
IMAGE PROCESSING APPARATUS
103
LIGHT SOURCE 0
LIGHT SOURCE 4
NORMAL VECTOR
LIGHT SOURCE VECTOR
104

LIGHT SOURCE 2
LIGHT SOURCE 1
LIGHT SOURCE 3
LIGHT SOURCE 0
103
LIGHT SOURCE 4
LIGHT SOURCE 7
LIGHT SOURCE 5
LIGHT SOURCE 6

110
LIGHT SOURCE UNIT
102
IMAGING UNIT
103
111
DISPLAY
MOUSE
112
113
KEYBOARD
101
INTERFACE
108
109
105
106
107
RAM
CPU
ROM

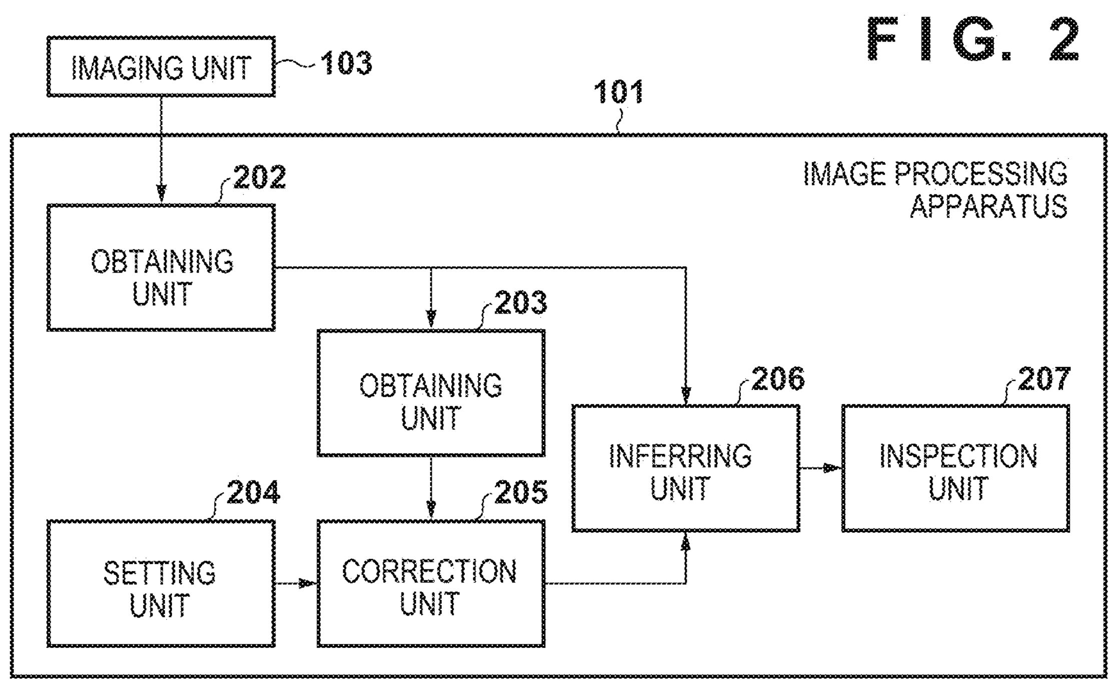
FIG. 2
FIG. 3
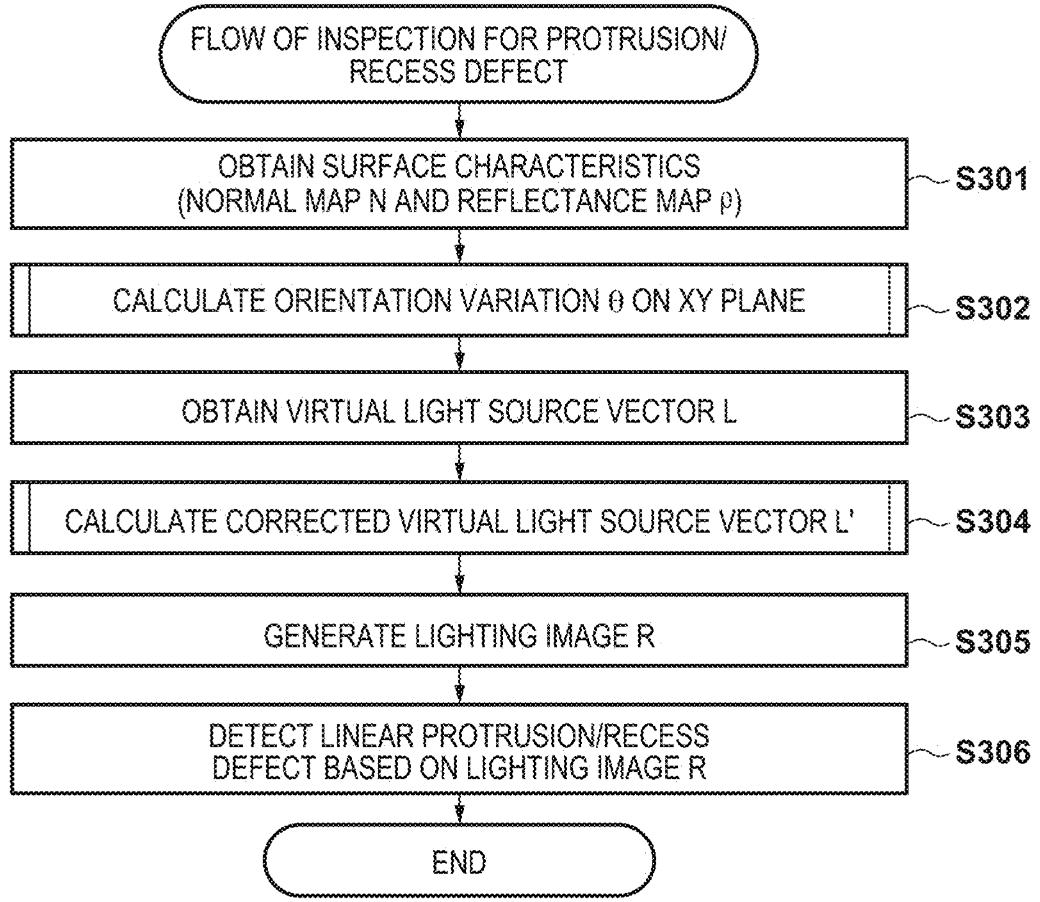

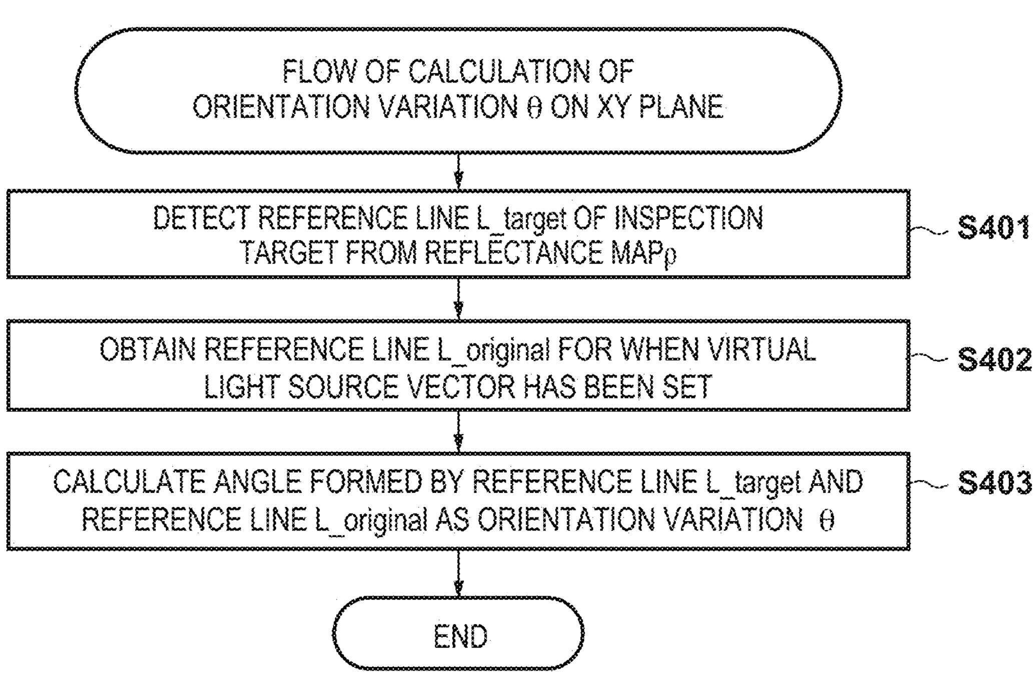
FIG. 4
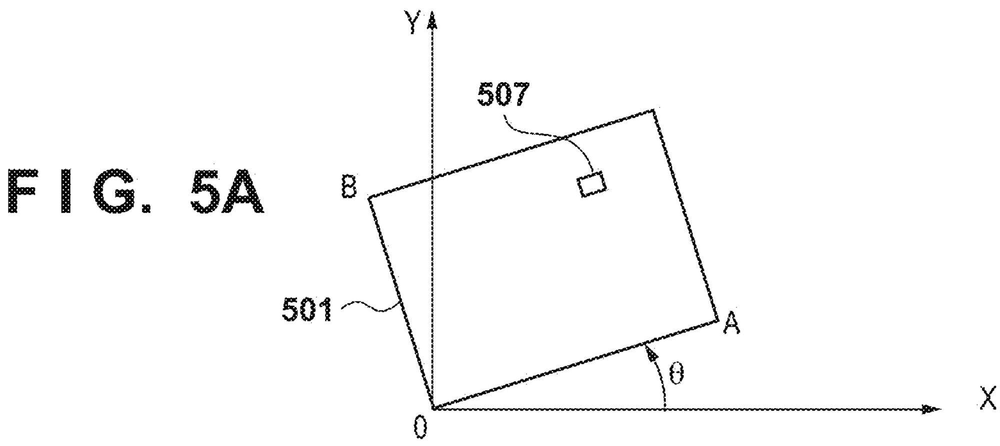
FIG. 5A
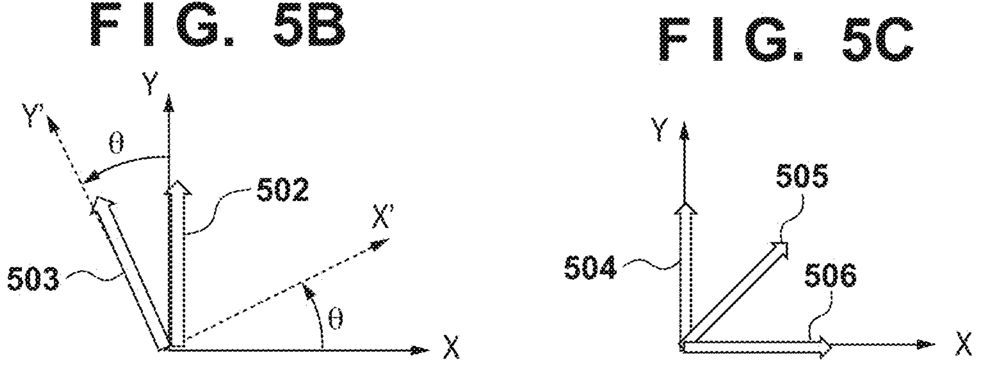
FIG. 5B
FIG. 5C

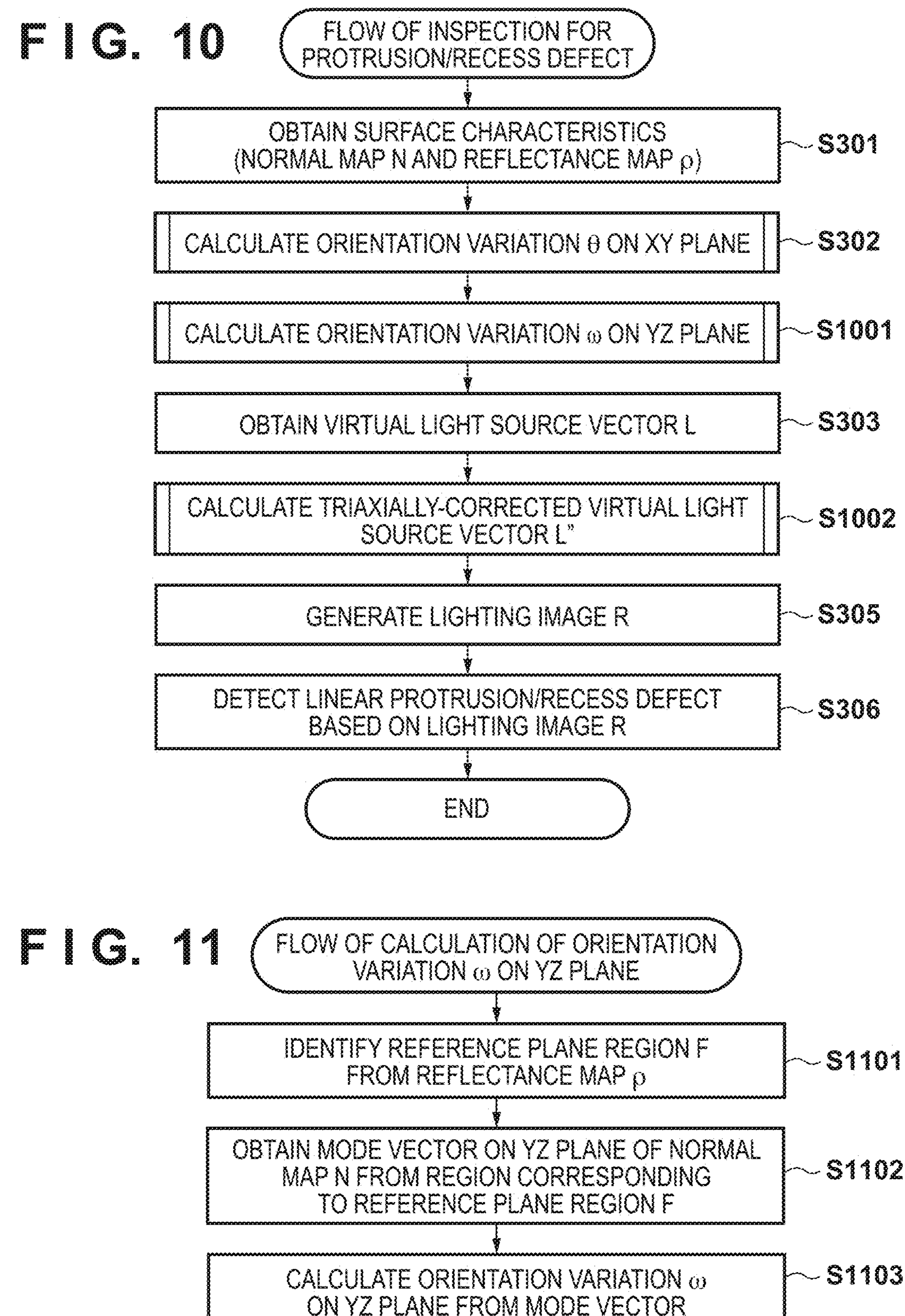
FIG. 10
FLOW OF INSPECTION FOR PROTRUSION/RECESS DEFECT
OBTAIN SURFACE CHARACTERISTICS (NORMAL MAP N AND REFLECTANCE MAP ρ)
S301
CALCULATE ORIENTATION VARIATION θ ON XY PLANE
S302
CALCULATE ORIENTATION VARIATION ω ON YZ PLANE
S1001
OBTAIN VIRTUAL LIGHT SOURCE VECTOR L
S303
CALCULATE TRIAXIALLY-CORRECTED VIRTUAL LIGHT SOURCE VECTOR L"
S1002
GENERATE LIGHTING IMAGE R
S305
DETECT LINEAR PROTRUSION/RECESS DEFECT BASED ON LIGHTING IMAGE R
S306
END
FIG. 11
FLOW OF CALCULATION OF ORIENTATION VARIATION ω ON YZ PLANE
IDENTIFY REFERENCE PLANE REGION F FROM REFLECTANCE MAP ρ
S1101
OBTAIN MODE VECTOR ON YZ PLANE OF NORMAL MAP N FROM REGION CORRESPONDING TO REFERENCE PLANE REGION F
S1102
CALCULATE ORIENTATION VARIATION ω ON YZ PLANE FROM MODE VECTOR
S1103
END

IMAGE PROCESSING APPARATUS, IMAGE PROCESSING METHOD, AND NON-TRANSITORY COMPUTER-READABLE STORAGE MEDIUM

BACKGROUND

Field of the Disclosure

The present disclosure relates to a technique for detecting a linear protrusion/recess on an inspection surface.

Description of the Related Art

A technique for detecting a protrusion/recess on an inspection surface is known as a technique for inspecting an appearance of an industrial product. Japanese Patent Laid-Open No. 2019-191105 discloses a technique in which an inspection surface is imaged with each light source of a multi-light illumination lit one at a time and, based on a plurality of images obtained by the imaging, a protrusion/recess defect is detected.

In inspection of an appearance of an industrial product, there is a need to detect linear protrusions/recesses that have a characteristic direction. For example, a scratch that is parallel to an outer frame of an inspection surface can be given as one example of such linear protrusions/recesses. There is a need to detect a fine protrusion/recess in particular among such linear protrusions/recesses.

According to the technique described in Japanese Patent Laid-Open No. 2019-191105, light can be irradiated from various directions by the multi-light illumination. Therefore, if light is irradiated perpendicularly to a direction of a linear protrusion/recess, even if the protrusion/recess is fine, it can be detected. For example, when detecting a scratch that is parallel to an outer frame of an inspection surface, light is irradiated perpendicularly to the outer frame of the inspection surface.

However, in a manufacturing line for industrial products, an orientation of an inspection object may vary. For example, an angle of rotation of an inspection surface around a vertical axis may vary. In a case of detecting a scratch that is parallel to an outer frame of an inspection surface by irradiating light perpendicularly to the outer frame of the inspection surface, if an angle of rotation of the inspection surface varies, light will not be irradiated perpendicularly to the scratch. As a result, a shadow cast by a protrusion/recess will be softer than when light is irradiated perpendicularly, and it will be difficult to detect a fine protrusion/recess.

SUMMARY

Some embodiments of the present disclosure provide a technique that allows detection of a fine linear protrusion/recess even if an orientation of an inspection object varies.

According to the first aspect of the present disclosure, there is provided an image processing apparatus comprising one or more memories storing instructions and one or more processors coupled to the one or more memories. Execution of the instructions causes the one or more processors to obtain a normal map indicating a spatial distribution of normals on a surface of an object; obtain a direction vector of a virtual light source according to a variation in orientation of the object; and perform processing for detecting a linear feature on the surface based on the normal map and the direction vector.

According to the second aspect of the present disclosure, there is provided an image processing method comprising obtaining a normal map indicating a spatial distribution of normals on a surface of an object, obtaining a direction vector of a virtual light source according to a variation in orientation of the object, and performing processing for detecting a linear feature on the surface based on the normal map and the direction vector.

According to the third aspect of the present disclosure, there is provided a non-transitory computer-readable storage medium storing computer-executable instructions that, when executed, cause a computer to obtain a normal map indicating a spatial distribution of normals on a surface of an object; obtain a direction vector of a virtual light source according to a variation in orientation of the object; and perform processing for detecting a linear feature on the surface based on the normal map and the direction vector.

Further features of various embodiments will become apparent from the following description of exemplary embodiments with reference to the attached drawings.

BRIEF DESCRIPTION OF THE DRAWINGS

FIG. 2 is a block diagram illustrating an example of a functional configuration for protrusion/recess defect inspection.

FIG. 3 is a flowchart for explaining an example of processing for performing inspection for a linear protrusion/recess.

FIG. 4 is a flowchart for explaining processing of step S302 in detail.

FIG. 5A is an explanatory view of a change in an orientation of an inspection object on an XY plane and rotation of a virtual light source vector.

FIG. 5B is an explanatory view of a change in the orientation of the inspection object on the XY plane and rotation of the virtual light source vector.

FIG. 5C is an explanatory view of a change in the orientation of the inspection object on the XY plane and rotation of the virtual light source vector.

FIG. 10 is a flowchart for explaining an example of processing for performing inspection for a linear protrusion/recess.

FIG. 11 is a flowchart for explaining processing of step S1001 in detail.

DESCRIPTION OF THE EMBODIMENTS

Figures 1A, 1B, 1C:
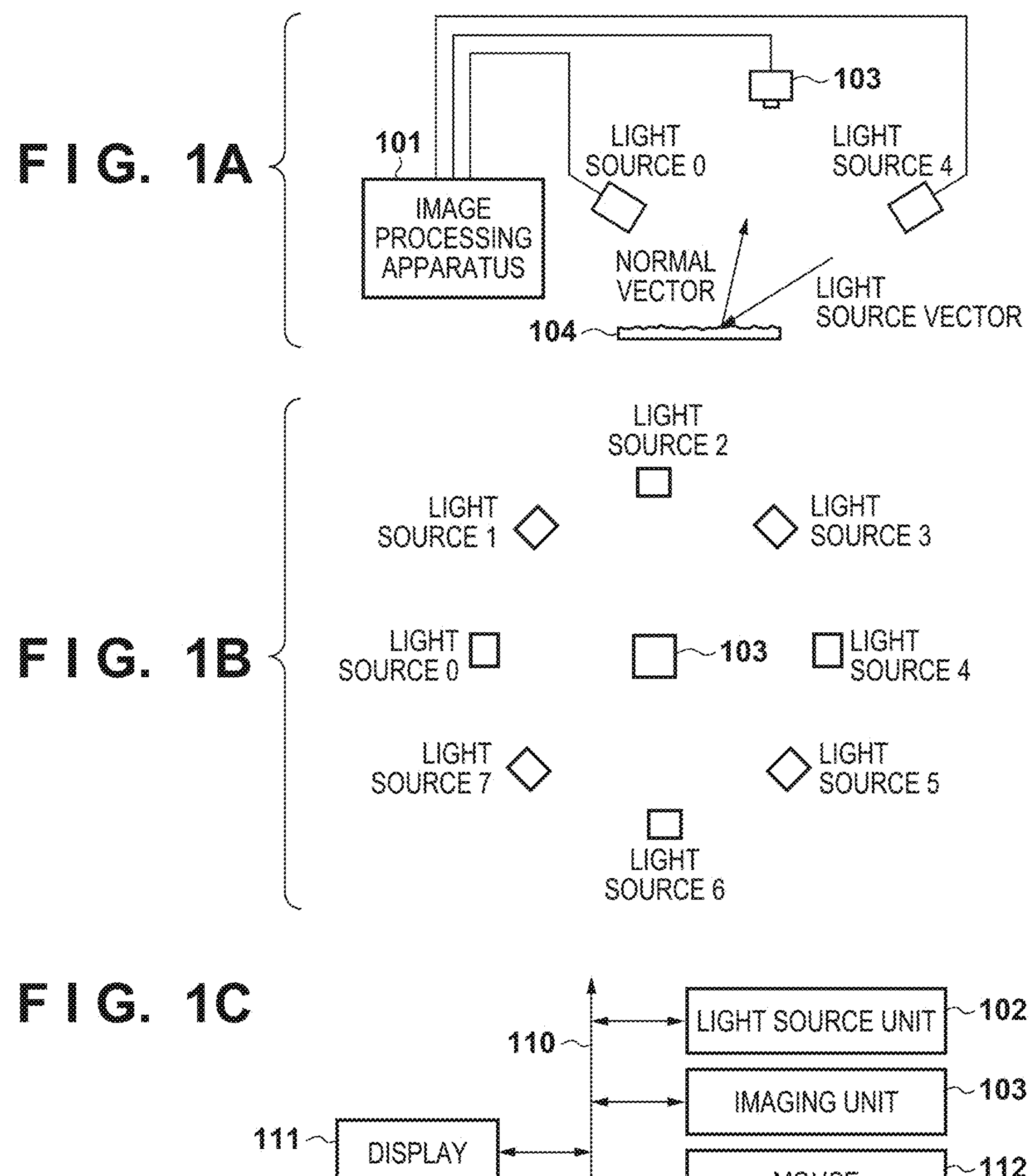
FIG. 1A is a diagram illustrating an example of a configuration of a system.
FIG. 1B is a diagram illustrating an example of a configuration of the system.
FIG. 1C is a diagram illustrating an example of a configuration of the system.

Hereinafter, embodiments will be described in detail with reference to the attached drawings. Note, the following embodiments are not intended to limit every embodiment. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

First Embodiment

An image processing apparatus according to the present embodiment first obtains a normal map representing a normal at each position on an inspection surface, which is a surface of an object to be inspected (inspection object). In the present embodiment, a photometric stereo method is used as a method of obtaining a normal map of an inspection surface, but another technique, such as a light-section method may be used, and the method of obtaining a normal map of an inspection surface is not limited to a specific method. The image processing apparatus generates a reflectance map indicating a spatial distribution of reflectances (albedo) on an inspection surface in the process for obtaining a normal map.

Next, the image processing apparatus obtains, as a reference irradiation direction, an irradiation direction (direction relative to an inspection surface), which has been set in advance as a direction of irradiation of light to be irradiated on an inspection surface in order to detect a linear protrusion/recess (linear protrusion/recess defect) on the inspection surface.

Then, the image processing apparatus obtains a variation in orientation of the inspection object and obtains, as a virtual light source direction (direction of light irradiated from a virtual light source), a direction whose direction relative to an inspection surface of the inspection object after orientation variation is a reference irradiation direction.

Then, the image processing apparatus infers, based on the normal map, on the reflectance map, and on the virtual light source direction, a luminance distribution on the inspection surface for when light is irradiated in the virtual light source direction from the virtual light source and, based on that inferred luminance distribution, performs processing for detecting a linear protrusion/recess on the inspection surface.

This makes it possible to obtain a luminance distribution on the inspection surface for when light is irradiated from the virtual light source whose direction relative to the inspection surface is the reference irradiation direction regardless of the orientation of the inspection object. For example, when performing inspection in which a scratch that is parallel to an outer frame of an inspection surface is detected as a linear protrusion/recess, even if there is a variation in orientation of the inspection object, it is possible to obtain a luminance distribution on the inspection surface for when light is irradiated in a direction that is always perpendicular to the outer frame of the inspection surface.

When light is irradiated perpendicularly to a direction of a linear protrusion/recess (e.g., scratch), a shadow cast by the protrusion/recesses will be at its darkest, and so, even if the protrusion/recess is fine, it will be detectable. Therefore, according to the present embodiment, it is possible to infer the luminance distribution for when light is irradiated perpendicularly to the direction of a linear protrusion/recess regardless of the orientation of the inspection object, and so, even if the orientation of the inspection object varies, it is possible to detect a fine linear protrusion/recess.

First, an example of a configuration of a system according to the present embodiment will be described with reference to FIGS. 1A to 1C. FIG. 1A illustrates a state in which a light source unit 102 and an imaging unit 103 are arranged being viewed from the side, and FIG. 1B illustrates that state being viewed from the top.

As illustrated in FIGS. 1A and 1B, the system according to the present embodiment includes light sources 0 to 7 included in the light source unit 102 (which is a dome-shaped multi-light illumination), the imaging unit 103, and an image processing apparatus 101. The light sources to be used in the photometric stereo method need only be three or more and are not limited to eight. An inspection object 104 is a target of inspection for a linear protrusion/recess according to the present system and is, for example, an industrial product, such as a home appliance or a cosmetic product.

The image processing apparatus 101 sequentially lights the light sources 0 to 7 one at a time. The image processing apparatus 101 images an inspection surface of the inspection object 104 in a state in which one light source is lit by controlling exposure, focus, imaging timing, and the like of the imaging unit 103.

For example, the image processing apparatus 101 images the inspection object 104 with the imaging unit 103 after lighting only the light source 0 and then images the inspection object 104 with the imaging unit 103 after lighting only the light source 1. By thus causing the imaging unit 103 to perform, for each of the light sources 0 to 7, an operation of imaging the inspection object 104 in a state in which only one light source is lit, the image processing apparatus 101 obtains eight captured images of the inspection object 104. The image processing apparatus 101 generates a normal map according to the photometric stereo method, based on the eight obtained captured images, and performs inspection for a linear protrusion/recess on the inspection surface of the inspection object 104 based on the normal map and a reflectance map obtained in the process of generating the normal map.

Next, an example of a hardware configuration of the system according to the present embodiment will be described with reference to a block diagram of FIG. 1C. The light source unit 102 and the imaging unit 103 are as described above, and so, the remaining functional units will be described.

A CPU 106 executes various kinds of processing using computer programs and data stored in a RAM 105. The CPU 106 thus controls the operation of the entire system including the image processing apparatus 101 and executes or controls various kinds of processing, which will be described as processing to be performed by the system.

The RAM 105 includes an area for storing computer programs and data loaded from a ROM 107 and an area for storing captured images obtained from the imaging unit 103. Further, the RAM 105 includes a work area that the CPU 106 uses when performing various kinds of processing. In this way, the RAM 105 can provide various kinds of areas as appropriate.

The ROM 107 stores setting data of the image processing apparatus 101, computer programs and data related to activation of the image processing apparatus 101, and computer programs and data related to a basic operation of the image processing apparatus 101. Further, the ROM 107 stores computer programs and data for causing the CPU 106 to execute or control various kinds of processing, which will be described as processing to be performed by the image processing apparatus 101.

An interface 108 functions as a communication interface for performing data communication between the image processing apparatus 101 and an external device connected to an external bus 110. The CPU 106, the RAM 105, the ROM 107 and the interface 108 are all connected to a system bus 109.

A display 111 includes a liquid crystal screen or a touch panel screen and can display a result of processing performed by the CPU 106 using images, characters, and the like. The display 111 may be a projection apparatus, such as a projector for projecting images and characters.

A keyboard 113 and a mouse 112 are examples of a user interface and, by being operated by a user, can input various kinds of information and instructions to the image processing apparatus 101. In addition to these, a touch panel screen, for example, may be adopted as the user interface.

<Generation of Normal Map by Photometric Stereo Method>

Next, a method for the image processing apparatus 101 to generate a normal map of the inspection surface of the inspection object 104 according to the photometric stereo method, based on the eight captured images captured by the imaging unit 103, will be described.

In the photometric stereo method, assuming Lambert's cosine law, assume that a reflection luminance of the inspection surface is proportional to a dot product of a direction vector indicating a direction of a light source and a normal vector. That is, assume that the following Equation (1) holds true at each position (x, y) on the inspection surface.

$$I_i = L_i N_\rho = [L_{ix}\ L_{iy}\ L_{iz}] \begin{bmatrix} \rho N_x \\ \rho N_y \\ \rho N_z \end{bmatrix} \quad (1)$$

In Equation (1), Ii is a reflection luminance at the position (x, y) for when only a light source i (i=0 to 7) is lit and can be obtained from a captured image. Li=(Lix, Liy, Liz) is a unit vector indicating a direction of the light source i at the position (x, y) and will be referred to as a light source vector below. In FIG. 1A, a light source vector indicating a direction of the light source 4 is illustrated.

$N\rho=(\rho Nx, \rho Ny, \rho Nz)^T$ indicates a pseudo-normal vector for which a normal vector $N=(Nx, Ny, Nz)^T$ has been multiplied by a constant of proportionality ρ at the position (x, y). T indicates transpose of a vector. The normal vector N is a unit vector, and the constant of proportionality ρ indicates a reflectance (albedo) at the position (x, y). In FIG. 1A, the normal vector is illustrated.

Equation (1) holds for the light sources 0 to 7, and when they are put together, the following Equation (2) is obtained. Furthermore, when a vector on the left side is denoted as I and an eight-row, three-column matrix on the right side is denoted as L, the following Equation (3) is obtained. Hereinafter, I will be referred to as a luminance vector, and L will be referred to as a light source matrix.

$$\begin{bmatrix} I_0 \\ I_1 \\ \vdots \\ I_7 \end{bmatrix} = \begin{bmatrix} L_{0x} & L_{0y} & L_{0z} \\ L_{1x} & L_{1y} & L_{1z} \\ \vdots & \vdots & \vdots \\ L_{7x} & L_{7y} & L_{7z} \end{bmatrix} \begin{bmatrix} \rho N_x \\ \rho N_y \\ \rho N_z \end{bmatrix} \quad (2)$$

$$I = L\ N_\rho \quad (3)$$

In Equation (3), a luminance vector I can be obtained from the eight captured images and a light source matrix L can be obtained from prior measurement; it can be said that Equation (3) is a simultaneous equation in which three components of a pseudo-normal vector Np are unknown numbers. If there are three light sources, the light source matrix L will be a three-row, three-column square matrix, if L is a regular matrix, by applying an inverse matrix $L^{-1}$ of L to the luminance vector I, a solution of Equation (3) is obtained.

Meanwhile, as in the present embodiment, when there are four or more light sources, Equation (3) is an overdetermined system of simultaneous equations. In this case, as indicated in Equation (4), by applying a pseudo-inverse matrix $(L^TL)^{-1}L^T$ of the light source matrix L to the luminance vector I, a least-squares solution of Equation (3) is obtained.

$$N_\rho = (L^T L)^{-1} L^T I \quad (4)$$

$$\rho = |N_\rho| \quad (5)$$

$$N = (1/\rho) N_\rho \quad (6)$$

At this time, a reflectance (albedo) ρ is obtained by Equation (5) as it corresponds to a length of the pseudo-normal vector Nρ. The normal vector N is obtained by Equation (6) because it is a unit vector for which the length of the pseudo-normal vector Np has been normalized to 1.

By performing calculation of the above-described Equations (4) to (6) for each position (x, y), it is possible to generate a normal map indicating a spatial distribution of normal vectors on the inspection surface. Further, in this process, a reflectance map indicating a spatial distribution of reflectances (albedo) on the inspection surface can be generated according to Equation (5).

<Protrusion/Recess Defect Inspection Using Normal Map and Virtual Light Source>

Next, an example of a functional configuration for protrusion/recess defect inspection, which is an example of inspection for a linear protrusion/recess, in the system according to the present embodiment will be described with reference to a block diagram of FIG. 2. An obtaining unit 202 obtains surface characteristics of the inspection object 104 as described above according to the photometric stereo method, based on eight images captured by the imaging unit 103. The surface characteristics are a normal map and a reflectance map of the inspection surface of the inspection object 104.

An obtaining unit 203 obtains, as a variation in orientation of the inspection object 104, an angle of the inspection object 104 (angle of rotation of the inspection surface around a vertical axis of the inspection surface of the inspection object 104) based on the surface characteristics obtained by the obtaining unit 202. In the present embodiment, an angle of rotation in a tilt direction is not obtained.

A setting unit 204 obtains a vector of a virtual light source direction for which it is assumed that light is irradiated from a direction that causes a shadow (visibility) of a linear protrusion/recess that has a characteristic direction to be at its darkest (highest). The vector obtained by the setting unit 204 corresponds to the light source vector Li in Equation (1) and is a unit vector indicating the virtual light source direction. Hereinafter, this unit vector will be referred to as a virtual light source vector.

In the present embodiment, a case where a scratch that occurs along an outer frame of the inspection surface of the inspection object 104 is targeted as a linear protrusion/recess having a characteristic direction will be described. At this time, the setting unit 204 obtains virtual light source vectors (set of virtual light source vectors) having a direction perpendicular to the outer frame of the inspection surface. For example, when the inspection surface is a square, the setting unit 204 obtains four virtual light source vectors.

A characteristic linear protrusion/recess that may be present varies depending on the type (product type) of the inspection object 104. Therefore, the setting unit 204 may hold a "set of virtual light source vectors" corresponding to the type (product type) of the inspection object 104. In that case, when the type (product type) of the inspection object 104 is designated, the setting unit 204, obtains a "set of virtual light source vectors" corresponding to the designated type.

A correction unit 205 obtains a vector (variation direction vector), for which the virtual light source vector has been changed (corrected) according to the variation in orientation obtained by the obtaining unit 203, as a virtual light source vector to be used in subsequent processing. For example, when performing inspection for a scratch that occurs along an outer frame of an inspection surface, a virtual light source vector that is perpendicular to the outer frame of the inspection surface is obtained. When a plurality of virtual light source vectors (set of virtual light source vectors) are inputted, correction is performed for all of the virtual light source vectors.

An inferring unit 206 infers a luminance distribution on an inspection surface for when light from a virtual light source is irradiated, using the normal map and the virtual light source vector, assuming Lambert's cosine law. More specifically, the inferring unit 206 obtains a dot product of the virtual light source vector corrected by the correction unit 205 and a normal vector corresponding to a pixel position in the normal map for each pixel position of the normal map. The inferring unit 206 thus obtains (infers) dot product values corresponding to respective pixel positions of the normal map as the luminance distribution of the inspection surface. The reflectance (albedo) may be considered when inferring the luminance distribution. Hereinafter, the luminance distribution that the inferring unit 206 obtains will be referred to as a lighting image.

An inspection unit 207 detects a linear protrusion/recess on an inspection surface based on the lighting image. For example, when a pixel having a pixel value exceeding a threshold is present among pixels in the lighting image, the inspection unit 207 determines that a linear protrusion/recess is present on the inspection surface. Meanwhile, when a pixel having a pixel value exceeding a threshold is not present among pixels in the lighting image, the inspection unit 207 determines that a linear protrusion/recess is present on the inspection surface.

The processing for detecting a linear protrusion/recess on an inspection surface based on the lighting image is not limited to the above threshold processing. For example, the inspection unit 207 may determine the presence or absence of a linear protrusion/recess in the lighting image or classify an orientation of the linear protrusion/recess by inputting the lighting image to a trained machine learning model for detecting a linear protrusion/recess and performing computation of that machine learning model.

Further, the inspection unit 207 may obtain a difference image between a reference image, which is a lighting image of the inspection surface without a linear protrusion/recess, and the lighting image and detect a linear protrusion/recess based on the difference image.

Next, an example of processing for inspection for a linear protrusion/recess performed by the image processing apparatus 101 will be described according to a flowchart of FIG. 3. In step S301, the obtaining unit 202 obtains surface characteristics (normal map N and reflectance map ρ of the inspection surface of the inspection object 104) as described above.

In step S302, the obtaining unit 203 calculates an orientation variation θ on an XY plane as a variation in orientation of the inspection object 104, based on the surface characteristics obtained in step S301. In the present embodiment, assume that the inspection surface is the XY plane, and an axis (axis in a height direction) perpendicular to the XY plane is a Z-axis. That is, as illustrated in FIG. 5A, assume that a bottom-left corner of an inspection surface 501 of the inspection object 104 is the origin, two axes orthogonal at the origin are an X-axis and a Y-axis, and an axis orthogonal to the X axis and the Y-axis is the Z-axis. In the present embodiment, assume that the inspection object 104 is not inclined in the height direction (i.e., Z-axis direction) and is inclined only on the XY plane. The inclination on the XY plane will be referred to as an orientation variation θ on the XY plane here. The orientation variation θ corresponds to an angle of rotation. A method of calculating the orientation variation θ on the XY plane will be described later.

In step S303, the setting unit 204 obtains a virtual light source vector L. In step S304, the correction unit 205 obtains, as a virtual light source vector L', a vector, for which the virtual light source vector L obtained in step S303 has been changed (corrected) according to the orientation variation θ obtained in step S302. The processing of step S304 will be described later in detail.

In step S305, the inferring unit 206 generates a lighting image R according to the following equation, using the surface characteristics (normal map N and reflectance map ρ) obtained in step S301 and the virtual light source vector L' obtained in step S304.

$$R(x, y) = \rho(x, y)N(x, y)^T \cdot L'$$

Here, ρ(x, y) indicates a reflectance at a pixel position (x, y), and N(x, y) indicates a normal vector at the pixel position (x, y). ρ(x, y) may be a constant value (ρ) regardless of x, y. Further, the reflectance map ρ may be omitted from this equation. In step S306, the inspection unit 207 detects a linear protrusion/recess defect on the inspection surface based on the lighting image R generated in step S305.

<Method of Calculating Orientation Variation θ>

The processing of step S302 (processing for calculating the orientation variation θ on the XY plane) described above will be described in detail according to a flowchart of FIG. 4. In step S401, the obtaining unit 203 detects a reference line L_target of the inspection object 104 from the reflectance map ρ included in the surface characteristics obtained in step S301. In the present embodiment, assume that a contour of the outer frame of the inspection surface of the inspection object 104 in a horizontal direction is a reference line L_target. In the example of FIG. 5A, when a bottom-right corner of the inspection surface 501 is A, a line segment OA is the reference line L_target. In the present embodiment, the obtaining unit 203 obtains, as the reference line L_target, the line segment OA, which is obtained by performing edge detection processing, which is processing for detecting an edge from the reflectance map ρ, after binarizing the value of each element in the reflectance map ρ.

Further, a method in which an image represented by the reflectance map ρ is divided into a plurality of regions using a clustering technique and the outer frame of the inspection surface is detected based on boundary lines of the regions may be employed. Alternatively, a method in which features are extracted from the reflectance map ρ and the outer frame of the inspection surface is detected based on those features may be employed. Various methods are conceivable for the method of obtaining the contour of the inspection surface in order to obtain the reference line L_target, and it is not limited to a specific method.

In step S402, the obtaining unit 203 obtains a reference line L_original for when the virtual light source vector has been set. This corresponds to a reference coordinate axis of a coordinate system in the inspection system, so to speak, and is the X-axis (i.e., line segment OX) in FIG. 5A.

In step S403, the obtaining unit 203 obtains an angle (less than 180 degrees) formed by the reference line L_target and the reference line L_original as the orientation variation θ. The obtaining unit 203 obtains the angle formed by the reference line L_target and the reference line L_original as follows, for example. First, the obtaining unit 203 defines a right-angled triangle for which one of the two reference lines is one of the sides except for the hypotenuse of the right-angled triangle and the other of the two reference lines to be the other of the sides except for the hypotenuse of the right-angled triangle. Then, the obtaining unit 203 obtains a result of calculating $\tan^{-1}$ (height of the right-angled triangle/length of the base of the right-angled triangle) as the orientation variation θ. In example of FIG. 5A, when the position of the bottom-right corner A is (Xa, Ya), the obtaining unit 203 obtains the orientation variation θ by calculating the following equation.

$$\theta = \tan^{-1}\{Ya/Xa\}$$

The method of obtaining an orientation variation is not limited to the method of obtainment based on surface characteristics. For example, an orientation sensor may be attached to the inspection object 104, and the obtaining unit 203 may obtain a variation in orientation of the inspection surface on the XY plane measured by the orientation sensor as the orientation variation θ.

<Correction of Virtual Light Source Vector>

Figure 6:
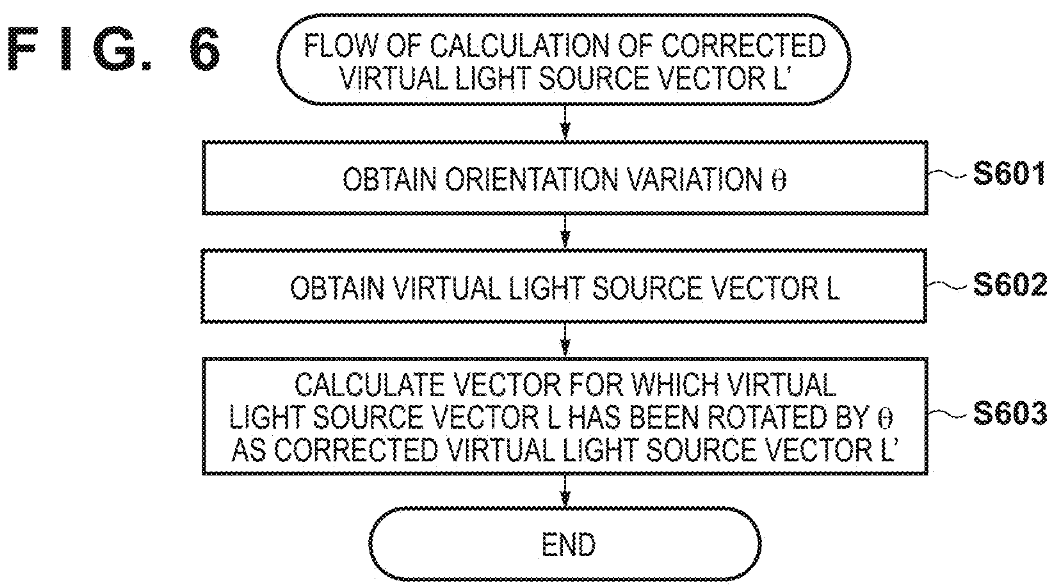
FIG. 6 is a flowchart for explaining processing of step S304 in detail.

The processing of step S304 described above will be described in detail according to a flowchart of FIG. 6. In step S601, the correction unit 205 obtains the orientation variation θ calculated in step S302.

In step S602, the correction unit 205 obtains the virtual light source vector L obtained in step S303. For example, the virtual light source vector L of the virtual light source that irradiates light perpendicularly to the line segment OA of FIG. 5A will be a virtual light source vector 502 of FIG. 5B.

In step S603, the correction unit 205 obtains, as a virtual light source vector L', a vector for which the virtual light source vector L obtained in step S602 has been rotated around the origin on the XY plane by the orientation variation θ calculated in step S601.

For example, assume that the virtual light source vector L is the virtual light source vector 502 of FIG. 5B. In this case, a virtual light source vector 503 for which the virtual light source vector 502 has been rotated by the orientation variation θ around an origin O will be the virtual light source vector L'. More specifically, when the virtual light source vector L=(Lx, Ly), the rotated virtual light source vector L'=(L'x, L'y) can be calculated according to the following equation.

$$L'_x = L_x\cos\theta - L_y\sin\theta$$

$$L'_y = L_x\sin\theta - L_y\cos\theta$$

Here, one virtual light source vector perpendicular to the line segment OA of FIG. 5A has been described. However, when a plurality of virtual light source vectors are obtained, virtual light source vectors rotated according to the orientation variation θ may be obtained by performing similar processing for each virtual light source vector.

For example, when a top-left corner of the inspection surface 501 is B, a virtual light source vector for which a virtual light source vector of a virtual light source that irradiates light perpendicularly to a line segment OB of FIG. 5A has been rotated in a similar manner according to the orientation variation θ may further be calculated.

As described above, according to the present embodiment, it is possible to infer a lighting image for when light is irradiated from an intended direction regardless of the variation in orientation of the inspection object, and thereby, even if the orientation of the inspection object varies, it is possible to detect a fine linear protrusion/recess.

Second Embodiment

In each of the following embodiments including the present embodiment, differences from the first embodiment will be described; assume that the rest is similar to the first embodiment unless otherwise mentioned below. In the first embodiment, by rotating a virtual light source vector according to a variation in orientation of an inspection object, a luminance distribution corresponding to light from a virtual light source always from the same direction is obtained regardless of the variation in orientation of the inspection object.

In the present embodiment, when the setting unit 204 obtains a plurality of virtual light source vectors, the virtual light source vectors are corrected more simply. For example, in a case where the corners of the outer frame of the inspection surface are rounded corners, which are rounded as in FIG. 5C, the setting unit 204 obtains three virtual light source vectors 504, 505, and 506 illustrated in FIG. 5C in order to detect a protrusion/recess defect that occurs along a rounded corner. In the following description, a case where the setting unit 204 obtains the virtual light source vectors 504, 505, and 506 will be described in order to provide a description with a specific example.

Figure 7:
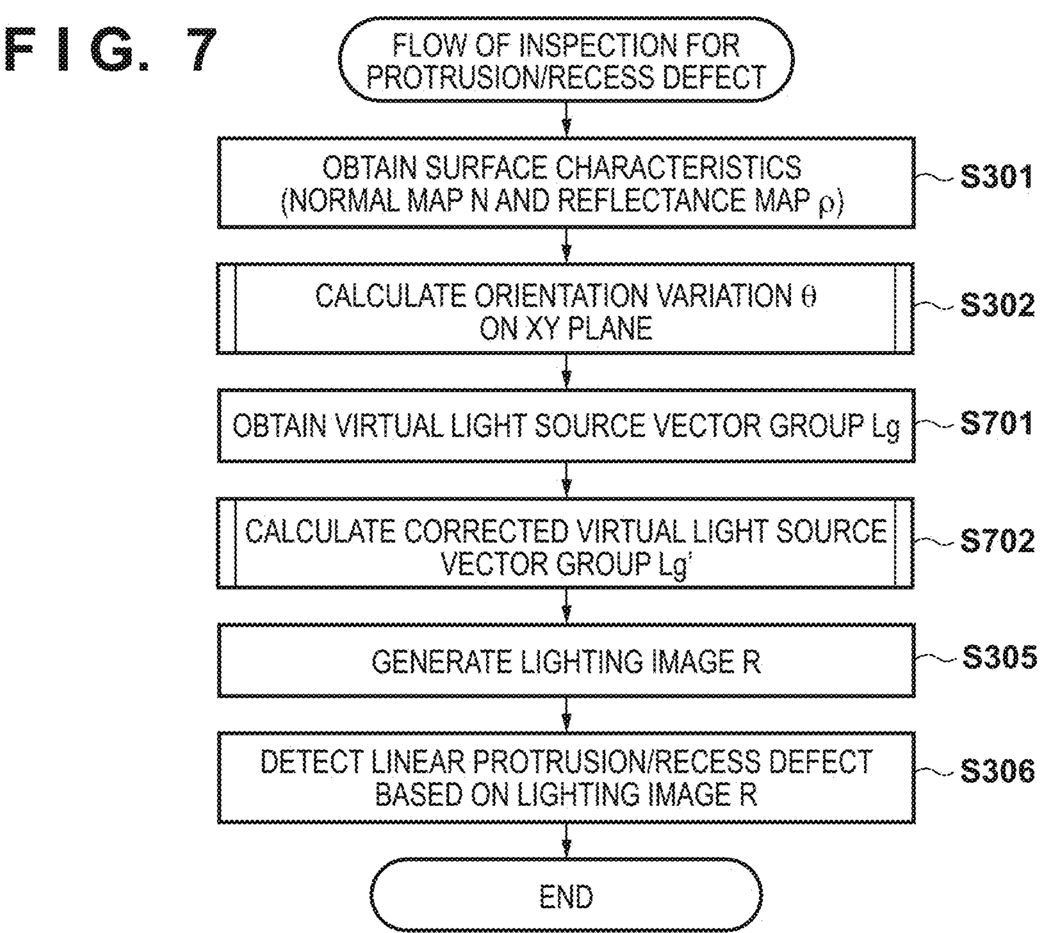
FIG. 7 is a flowchart for explaining an example of processing for performing inspection for a linear protrusion/recess.

An example of processing for inspection for a linear protrusion/recess performed by the image processing apparatus 101 will be described according to a flowchart of FIG. 7. In FIG. 7, the same step numerals are given to processing steps similar to the processing steps indicated in FIG. 3, and the description for those processing steps will be omitted.

In step S701, the setting unit 204 obtains a virtual light source vector group Lg, which is a set of virtual light source vectors (here, the virtual light source vector 504, 505, and 506 indicated in FIG. 5C).

Figure 8:
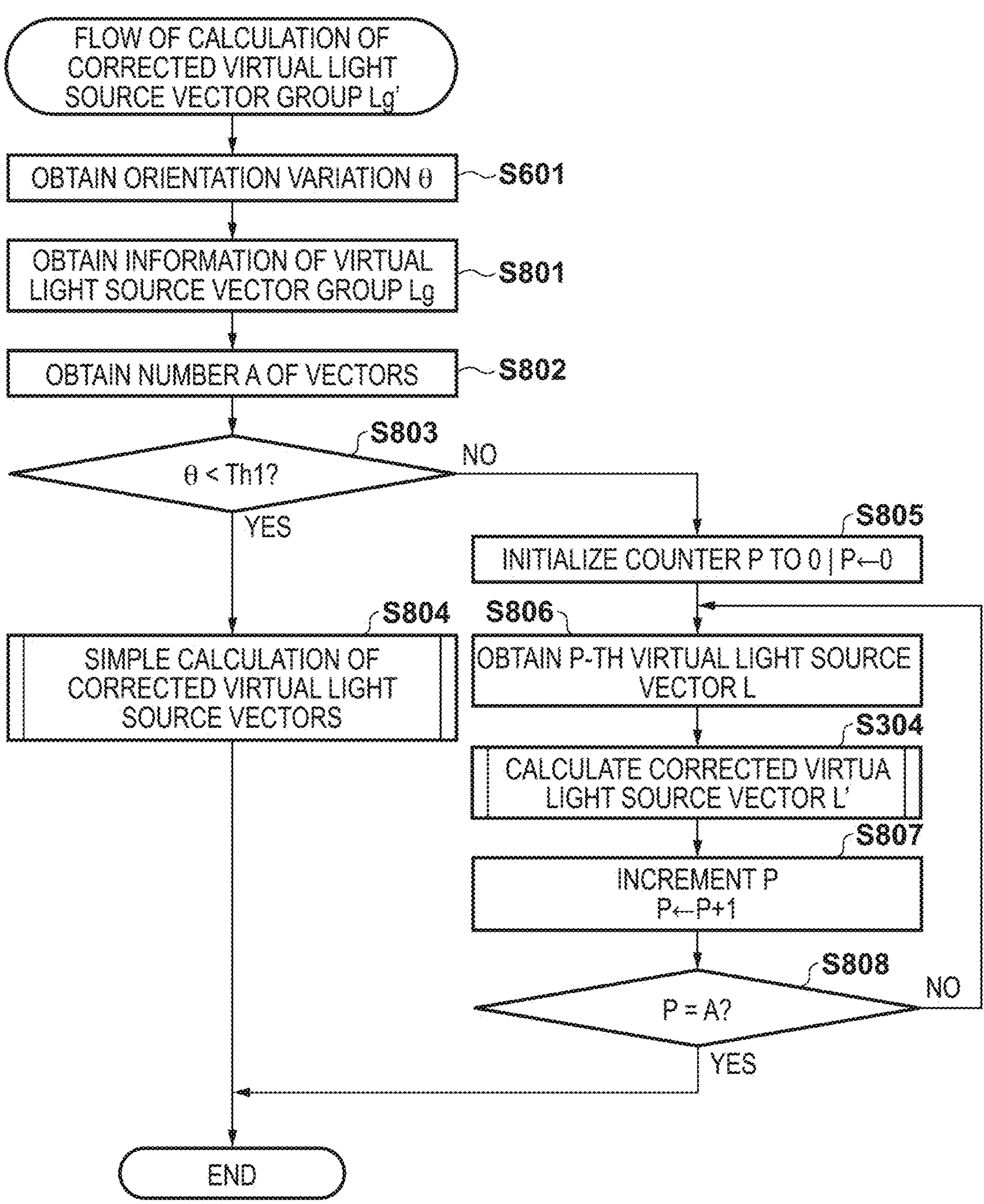
FIG. 8 is a flowchart for explaining processing of step S702 in detail.

In step S702, the correction unit 205 corrects the virtual light source vector group Lg. The processing of step S702 will be described in detail according to a flowchart of FIG. 8. In FIG. 8, the same step numerals are given to processing steps similar to the processing steps indicated in FIG. 6, and the description for those processing steps will be omitted.

In step S801, the correction unit 205 obtains information of the virtual light source vector group Lg. The information of the virtual light source vector group Lg may include the number of virtual light source vectors included in the virtual light source vector group Lg, an angle between adjacent virtual light source vectors, and the like.

In step S802, the correction unit 205 obtains the number A of virtual light source vectors (number of vectors) included in the virtual light source vector group Lg from the information obtained in step S801.

In step S803, the correction unit 205 determines whether the orientation variation θ is less than a threshold (less than Th1). As a result of this determination, if the orientation variation θ is less than the threshold Th1, the processing proceeds to step S804, and if the orientation variation θ is greater than or equal to the threshold (greater than or equal to Th1), the processing proceeds to step S805. In the present embodiment, Th1=10°.

In step S804, the correction unit 205 obtains a virtual light source vector group Lg' for which the virtual light source vector group Lg has been corrected using a simple calculation method. The processing of step S804 will be described later in detail.

In step S805, the correction unit 205 initializes the value of a counter P to 0. Then, in step S806, the correction unit 205 selects (obtain) one virtual light source vector that has not been selected as a selected virtual light source vector L from virtual light source vectors included in the virtual light source vector group Lg. For example, the correction unit 205 selects, as the selected virtual light source vector L, a virtual light source vector corresponding to a P-th virtual light source vector when the virtual light source vectors included in the virtual light source vector group Lg are arranged in an appropriate order.

Then, in step S304, the correction unit 205 obtains, as a virtual light source vector L', a vector for which the selected virtual light source vector L selected in step S806 has been changed (corrected) according to the orientation variation θ obtained in step S302, as in the first embodiment.

In step S807, the correction unit 205 increments the value of a counter P by 1. In step S808, the correction unit 205 determines whether the value of a counter P is the same as A. As a result of this determination, if the value of the counter P is the same as A, the processing proceeds to step S305. Meanwhile, if the value of the counter P is not the same as A, the processing proceeds to step S806.

Figure 9:
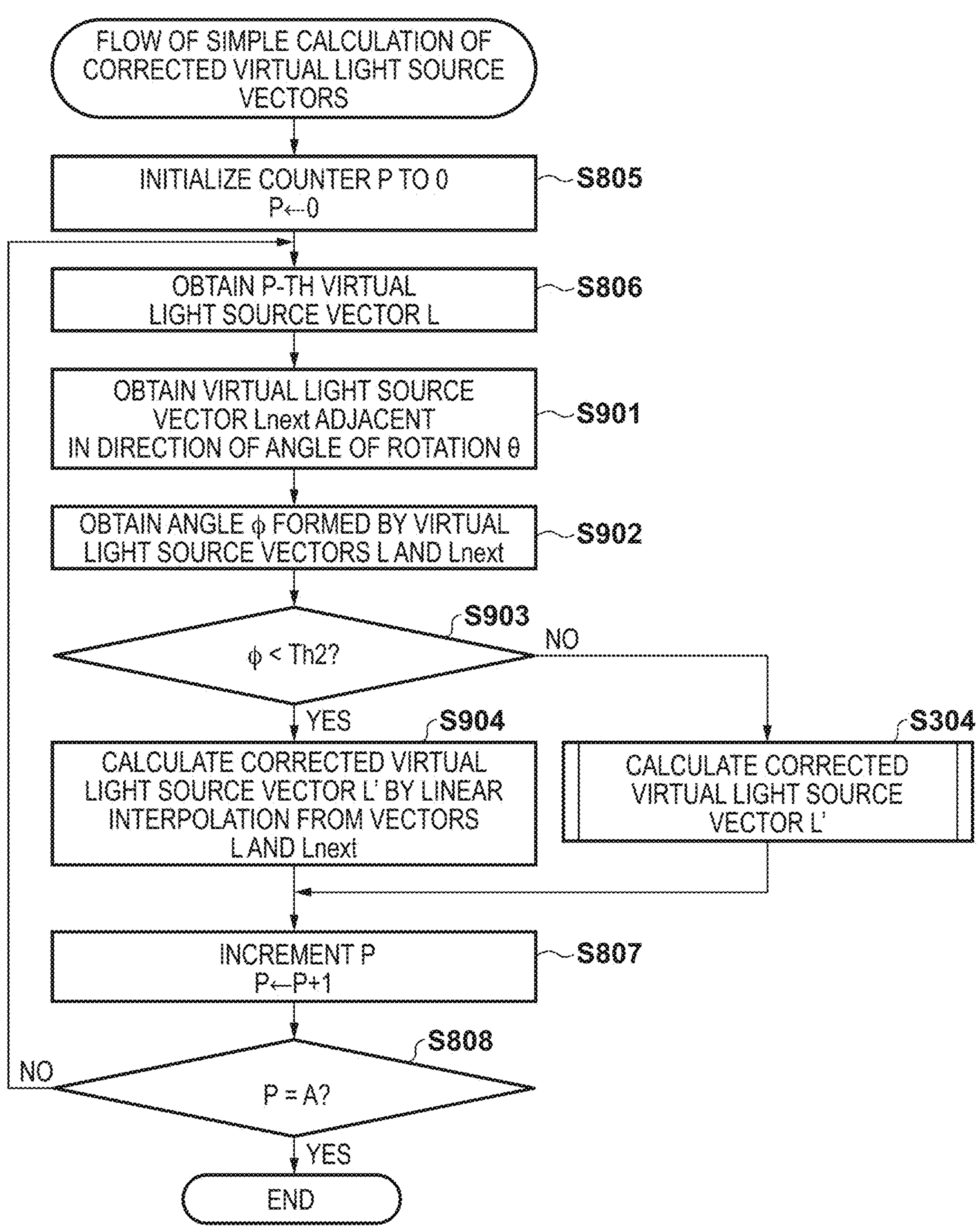
FIG. 9 is a flowchart for explaining processing of step S804 in detail.

Next, the processing of step S804 described above will be described in detail according to a flowchart of FIG. 9. In FIG. 9, the same step numerals are given to processing steps similar to the processing steps indicated in FIGS. 3 and 8, and the description for those processing steps will be omitted.

In step S901, the correction unit 205 obtains, from the virtual light source vector group Lg, a virtual light source vector Lnext adjacent to the selected virtual light source vector L in a direction of an angle of rotation θ. For example, when the virtual light source vector 505 is selected as the selected virtual light source vector L in FIG. 5C, the virtual light source vector 504 adjacent to the virtual light source vector 505 in the direction of the angle of rotation θ (i.e., counterclockwise direction) is obtained as the virtual light source vector Lnext.

In step S902, the correction unit 205 obtains an angle φ formed by the selected virtual light source vector L and the virtual light source vector Lnext from the information obtained in step S801. The angle φ formed by the selected virtual light source vector L and the virtual light source vector Lnext may be calculated by the correction unit 205.

In step S903, the correction unit 205 determines whether the angle φ obtained in step S902 is less than a threshold Th2. As a result of this determination, if the angle φ obtained in step S902 is less than the threshold Th2, the processing proceeds to step S904. Meanwhile, if the angle φ obtained in step S902 is greater than or equal to the threshold Th2, the processing proceeds to step S304. In the present embodiment, Th2=10°.

In step S904, the correction unit 205 obtains the corrected virtual light source vector L' by calculating the following interpolation using the selected virtual light source vector L, the virtual light source vector Lnext, the orientation variation θ, and the angle φ.

$$L' = \{1 - (\theta/\varphi)\}L + (\theta/\varphi)Lnext$$

Various methods are conceivable for the method of interpolation using these pieces of information, and it is not limited to a specific interpolation method. Further, in the processing according to the flowchart of FIG. 9, there is no virtual light source vector Lnext adjoining the selected virtual light source vector selected in an (A−1)-th round in the direction of the orientation variation θ. Accordingly, a configuration may be taken such that when the (A−1)-th selected virtual light source vector is selected in step S806, the processing proceeds to step S304, and the correction unit 205 obtains, as the virtual light source vector L', a vector for which the (A−1)-th selected virtual light source vector L has been changed (corrected) according to the orientation variation θ. For example, a configuration may also be taken such that when the processing of step S904 is performed for the (A−2)-th selected virtual light source vector, the correction unit 205 outputs the (A−1)-th selected virtual light source vector as the corrected virtual light source vector L'.

In the simple calculation of the virtual light source vector L' in step S904, a line segment formed by connecting the distal ends of the virtual light source vector L and the virtual light source vector Lnext using a straight line is assumed. Then, a vector directed to a point at which that line segment is divided into (1−θ/φ):(θ/φ) is obtained by linear interpolation. If θ is sufficiently small, the magnitude of the virtual light source vector L' obtained by linear interpolation can be regarded as approximately the same as that of the virtual light source vector L before the correction. For that purpose, there is a condition that the angle θ of orientation variation and the angle φ formed by the two virtual light source vectors used for linear interpolation are smaller than the thresholds Th1 and Th2. In the present embodiment, the above-described equation of linear interpolation is used only when the orientation variation θ and the angle φ are sufficiently small, but an equation of spherical linear interpolation may be used and the condition may be relaxed.

Third Embodiment

In the first and second embodiments, a case where the inspection object is not inclined with respect to the Z-axis and inclination occurs on the XY plane has been described. Meanwhile, the inspection object may be inclined with respect to the Z-axis due to vibration or the like. In this case, the virtual light source vector is rotated about the X-axis (or Y-axis) on a YZ plane (or XZ plane) after being rotated about the Z-axis on the XY plane. Hereinafter, a case where the inspection object is inclined with respect to the Z-axis will be described.

An example of processing for inspection for a linear protrusion/recess performed by the image processing apparatus 101 will be described according to a flowchart of FIG. 10. In FIG. 10, the same step numerals are given to processing steps similar to the processing steps indicated in FIG. 3, and the description for those processing steps will be omitted.

In step S1001, the obtaining unit 203 calculates an orientation variation ω of the inspection object 104 on the YZ plane. The processing of step S1001 will be described later in detail. In step S1002, the correction unit 205 obtains, as a virtual light source vector L", a vector for which the virtual light source vector L obtained in step S303 has been changed (corrected) using the orientation variation θ obtained in step S302 and the orientation variation ω obtained in step S1001. The processing of step S1002 will be described later in detail.

The processing from step S305 onward is similar to that of the first embodiment, except that the virtual light source vector L" is used instead of the virtual light source vector L'. Next, the processing of step S1001 described above will be described in detail according to a flowchart of FIG. 11.

In step S1101, the obtaining unit 203 identifies a reference plane region F of the inspection object 104 from the reflectance map ρ. In the present embodiment, a flat region in the image of the inspection object 104 that is parallel to the XY plane on the XYZ-axes on which the virtual light source vector L is set is set in advance as the reference plane region F. Assume that the reference plane region F is defined by a position relative to a reference line of the inspection object 104. In the present embodiment, assume that the line segment OA and the line segment OB, which correspond to the outer frame of the inspection surface 501 illustrated in FIG. 5A, are reference lines. Assume that then a region surrounded by four points, (0.85, 0.85), (0.85, 0.70), (0.70, 0.85), and (0.70, 0.70), in coordinates for which the respective lengths of the line segment OA and the line segment OB have been normalized to 1 is defined as the reference plane region F. That is, assume that a region 507 of FIG. 5A is set in advance as the reference plane region F in the present embodiment.

Next, in step S1102, the obtaining unit 203 identifies a region corresponding to the reference plane region F in the normal map N and obtains the most frequent normal vector (mode vector) on the YZ plane of the normal vectors in the identified region. Since the normal map N is susceptible to noise, the most frequent normal vector is identified as a normal vector of the inspection object 104 with respect to the XY plane.

In step S1103, the obtaining unit 203 calculates the orientation variation ω on the YZ plane from the most frequent normal vector obtained in step S1102. For example, the obtaining unit 203 projects the most frequent normal vector on the YZ plane and sets an angle with respect to the Z-axis of the projected vector as the orientation variation ω. The method of obtaining the orientation variation ω is not limited to a specific method, and for example, an orientation sensor may be attached to the inspection object 104, and the obtaining unit 203 may obtain a variation in orientation of the inspection object 104 on the YZ plane measured by the orientation sensor as the orientation variation ω.

Figure 12:
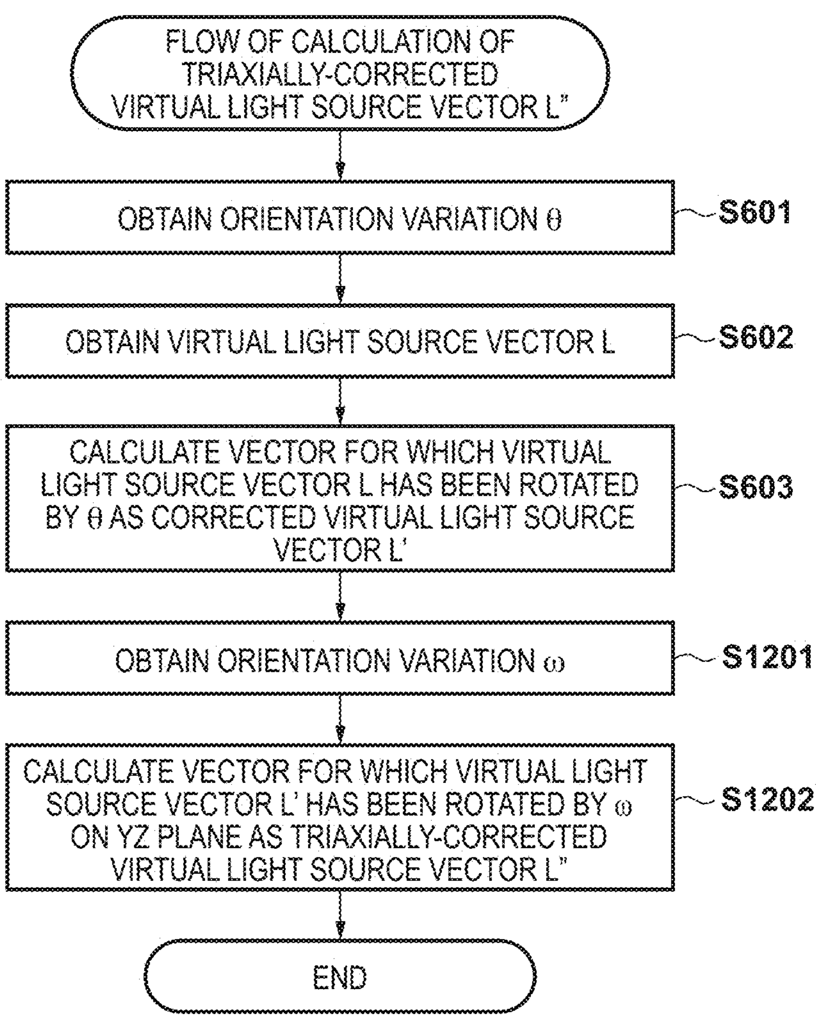
FIG. 12 is a flowchart for explaining processing of step S1002 in detail.

Next, the processing of step S1002 described above will be described in detail according to a flowchart of FIG. 12. In FIG. 12, the same step numerals are given to processing steps similar to the processing steps indicated in FIG. 6, and the description for those processing steps will be omitted.

In step S1201, the correction unit 205 obtains the orientation variation ω calculated in step S1001. In step S1202, the correction unit 205 obtains, as the triaxially-corrected virtual light source vector L" a vector for which the virtual light source vector L' corrected in step S603 has been rotated around the origin on the YZ plane by the orientation variation ω calculated in step S1201. More specifically, when the virtual light source vector L'=(L'x, L'y, L'z), the triaxially-corrected virtual light source vector L"=(L"x, L"y, L"z) is calculated according to the following equation.

$$L''_X = L'_x$$

$$L''_y = L_y\cos\theta - L_Z\sin\theta$$

$$L''_z = L_y\sin\theta + L_z\cos\theta$$

As described above, in all of the embodiments described above, it is possible to set a virtual light source that irradiates light while always keeping a constant angle with respect to the inspection object regardless of the variation in orientation of the inspection object and create a lighting image. Therefore, even if the orientation of the inspection object varies, it is possible to always perform detection of a linear protrusion/recess on the surface of the inspection object in a consistent condition, and it is possible to detect a fine linear protrusion/recess.

In each of the embodiments described above, for simplicity, a description has been given using the bottom-left corner of the inspection object as the origin, but some embodiments are not limited thereto. That is, each process described above may be performed with the center of the inspection object or the top-right corner of the inspection object as the origin.

Further, the origin may be shifted in each axial direction from the outer frame rather than be aligned to the outer frame of the inspection object. It goes without saying that depending on the position of the origin, it is necessary to transform the equations used in the description of each of the embodiments described above according to the coordinate system to be used.

In each of the embodiments described above, although output of the result of the inspection by the inspection unit 207 is not mentioned, the form of output of the result of the inspection by the inspection unit 207 is not limited to a specific form of output.

The numerical values, processing timing, processing order, processing entity, color space, data (information) obtainment method/transmission destination/transmission source/storage location, and the like used in each of the embodiments described above have been given as examples for the sake of providing a concrete explanation, and some embodiments are not limited to such examples.

Further, some or all of the embodiments described above may be appropriately combined and used. Further, some or all of the embodiments described above may be selectively used.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-107221, which was filed on Jun. 29, 2023 and which is hereby incorporated by reference herein in its entirety.

What is claimed is:

1. An image processing apparatus comprising:

one or more memories storing instructions; and one or more processors coupled to the one or more memories, wherein execution of the instructions causes the one or more processors to:

obtain a normal map indicating a spatial distribution of normals on a surface of an object;

obtain a direction vector of a virtual light source according to a variation in orientation of the object;

obtain a luminance distribution on the surface based on the normal map and the direction vector; and perform processing for detecting a linear feature on the surface based on the normal map, the direction vector, and the luminance distribution.

2. The image processing apparatus according to claim 1, wherein the processing for detecting a linear feature on the surface includes processing for detecting a linear protrusion/recess on the surface.

3. The image processing apparatus according to claim 1, wherein execution of the instructions further causes the one or more processors to obtain the normal map based on a plurality of captured images obtained by imaging the object with each of a plurality of light sources sequentially lit.

4. The image processing apparatus according to claim 1, wherein execution of the instructions further causes the one or more processors to:

obtain a reflectance map indicating a spatial distribution of reflectances on the surface based on a plurality of captured images obtained by imaging the object with each of a plurality of light sources sequentially lit.

5. The image processing apparatus according to claim 4, wherein execution of the instructions further causes the one or more processors to:

obtain the luminance distribution on the surface based on the normal map, the direction vector, and the reflectance map.

6. The image processing apparatus according to claim 1, wherein execution of the instructions further causes the one or more processors to:

in a case where the variation in orientation is greater than or equal to a threshold, change the direction vector of the virtual light source according to the variation in orientation.

7. The image processing apparatus according to claim 1, wherein execution of the instructions further causes the one or more processors to:

in a case where the variation in orientation is less than a threshold and an angle formed by a direction vector of a first virtual light source and a direction vector of a second virtual light source adjacent to the direction vector of the first virtual light source is less than a threshold, obtain the direction vector of the virtual light source based on the direction vector of the first virtual light source and the direction vector of the second virtual light source.

8. The image processing apparatus according to claim 1, wherein execution of the instructions further causes the one or more processors to:

in a case where the variation in orientation is less than a threshold and an angle formed by a direction vector of a first virtual light source and a direction vector of a second virtual light source adjacent to the direction vector of the first virtual light source is greater than or equal to a threshold, change the direction vector of the first virtual light source according to the variation in orientation.

9. The image processing apparatus according to claim 1, wherein execution of the instructions further causes the one or more processors to:

change a vector of an irradiation direction set in advance as an irradiation direction of light to be irradiated on the surface for detection of a linear protrusion/recess on the surface, according to the variation in orientation.

10. The image processing apparatus according to claim 1, wherein the variation in orientation is an inclination of the object.

11. The image processing apparatus according to claim 1, wherein the variation in orientation is an angle of rotation of the object on one plane.

12. The image processing apparatus according to claim 1, wherein the variation in orientation includes an angle of rotation of the object on a first plane and an angle of rotation of the object on a second plane.

13. An image processing method comprising:

obtaining a normal map indicating a spatial distribution of normals on a surface of an object;

obtaining a direction vector of a virtual light source according to a variation in orientation of the object;

obtain a luminance distribution on the surface based on the normal map and the direction vector; and performing processing for detecting a linear feature on the surface based on the normal map, the direction vector, and the luminance distribution.

14. A non-transitory computer-readable storage medium storing computer-executable instructions that, when executed, cause a computer to:

obtain a normal map indicating a spatial distribution of normals on a surface of an object;

obtain a direction vector of a virtual light source according to a variation in orientation of the object;

obtain a luminance distribution on the surface based on the normal map and the direction vector; and perform processing for detecting a linear feature on the surface based on the normal map, the direction vector, and the luminance distribution.

* * * * *